US00RE35228E

United States Patent [19]

Mowry et al.

[11] E Patent Number: Re. 35,228

[45] Reissued Date of Patent: May 7, 1996

[54] INDUCTIVE THIN FILM HEAD HAVING IMPROVED READBACK CHARACTERISTICS

[75] Inventors: Gregory S. Mowry, Burnsville; Charles H. Tolman, Bloomington, both of Minn.

[73] Assignee: Seagate Technology, Inc., Scotts Valley, Calif.

[21] Appl. No.: 351,780

[22] Filed: Dec. 8, 1994

Related U.S. Patent Documents

Reissue of:

[64] Patent No.: 5,170,303
Issued: Dec. 8, 1992
Appl. No.: 516,158
Filed: Apr. 30, 1990

[51] Int. Cl.[6] ..... G11B 5/147

[52] U.S. Cl. ..... 360/126; 360/122; 360/123

[58] Field of Search ..... 360/126, 122–123

[56] References Cited

U.S. PATENT DOCUMENTS

| | | | |
|---|---|---|---|
| 4,242,710 | 12/1980 | Hempstead et al. | 360/113 |
| 4,295,173 | 10/1981 | Romankiw et al. | 360/125 |
| 4,353,102 | 10/1982 | Kanai et al. | 360/126 |
| 4,386,383 | 5/1983 | Desserre et al. | 360/126 |
| 4,423,451 | 12/1983 | Chi | 360/125 |
| 4,458,279 | 7/1984 | Katz | 360/122 |
| 4,490,760 | 12/1984 | Kaminaka et al. | 360/126 |
| 4,589,042 | 5/1986 | Anderson et al. | 360/125 |
| 4,626,947 | 12/1986 | Narishige et al. | 360/122 |
| 4,644,432 | 2/1987 | Heim | 360/111 |
| 4,672,495 | 6/1987 | Matsumoto | 360/125 |
| 4,713,711 | 12/1987 | Jones, Jr. et al. | 360/123 |
| 4,750,070 | 6/1988 | Maruyama | 360/125 |
| 4,797,765 | 1/1989 | Ezaki et al. | 360/110 |
| 4,800,454 | 1/1989 | Schwarz et al. | 360/123 |
| 4,807,076 | 2/1989 | Nakashima et al. | 360/110 |
| 4,819,111 | 4/1989 | Keel et al. | 360/125 |
| 4,821,133 | 4/1989 | Mowry et al. | 360/113 |
| 4,873,599 | 10/1989 | Sueka | 360/122 |
| 4,897,747 | 1/1990 | Meunier et al. | 360/122 |
| 4,900,650 | 2/1990 | Das | 360/126 |
| 5,384,680 | 1/1995 | Mallary | 360/126 |

FOREIGN PATENT DOCUMENTS

| | | | |
|---|---|---|---|
| 0040994 | 2/1981 | European Pat. Off. . | |
| 57-203219 | 3/1983 | Japan . | |
| 59-77715 | 10/1984 | Japan | 360/113 |
| 1-098110 | 7/1989 | Japan . | |
| 2-78006 | 3/1990 | Japan | 300/113 |

OTHER PUBLICATIONS

EDN, vol. 22, No. 7, Apr. 5, 1977, pp. 32, 34 "Thin Film Magnetic Recording Heads Promise to Increase Storage Densities" by Roscamp et al.

"IBM 3370 Film Head Design and Fabrication" by Jones, Jr.

*Primary Examiner*—John H. Wolff
*Attorney, Agent, or Firm*—Westman, Champlin & Kelly

[57] ABSTRACT

An inductive thin film magnetic head carried on a substrate having a reduced susceptibility to the "glitch" effect or "remote read" effect. The inductive thin film head uses a three point approach using hard axis only drive fields, narrow paddles and shortened pole tips which are spaced apart from a saw alley when the substrate is sliced.

12 Claims, 3 Drawing Sheets

INDUCTIVE THIN FILM HEAD HAVING IMPROVED READBACK CHARACTERISTICS

Matter enclosed in heavy brackets [ ] appears in the original patent but forms no part of this reissue specification; matter printed in italics indicates the additions made by reissue.

BACKGROUND OF THE INVENTION

The present invention relates to inductive thin film magnetic read/write heads. In particular, the invention relates to an improved thin film head design which provides fewer erroneous output spikes due to "glitches" during the read back operation.

Thin film magnetic read/write heads are used for magnetically reading and writing information on a magnetic storage medium such as a magnetic disk which are in motion relative to one another. A thin film magnetic head comprises a pair of "yokes" or "paddles" which form the magnetic core of the head. Electrical conductors pass between the two paddles and are used for both reading and writing information on the magnetic storage medium. During a write operation, electrical current is caused to flow through the conductors which generates a magnetic field in the paddle. The structure includes a gap region which comprises a small space between the two tips of the two paddles. The write current in the coils causes magnetic flux to span the gap region. This magnetic flux is then used to impress a magnetic field upon a storage medium during the write operation which results in a magnetic transition being recorded. During the read operation the magnetic head and the storage medium also move relative to each other causing a changing magnetic field to be induced in the coil and the coils link the magnetic circuit. Electric signals in the conductors may be sensed with electric circuitry which allows recovery of information stored on the magnetic medium.

The performance of a thin film magnetic head is degraded by a phenomenon known as the "glitch" effect or "remote read" effect. The remote read effect is characterized by a voltage noise spike generated by the head in the coils after a random delay following completion of a write process. The voltage spike is of sufficient magnitude to be decoded as valid data which causes a system error. In prior art thin film magnetic heads, the glitch typically has a probability of occurring about once in every $10^3$ to $10^5$ write operations.

The occurrence of a glitch causes incorrect data to be read back from the magnetic medium and is highly undesirable. The prior art does not explain the interrelation of both design and material properties used a thin film head on the remote read effect. An improved thin film head in which the glitch effect or remote read effect is statistically less likely would be a significant improvement to the art.

SUMMARY OF THE INVENTION

The subject invention relates top the elimination or minimization of an effect known variously as the "glitch" effect or "remote read" effect in inductive thin film head transducers. The remote read effect is characterized by a voltage noise spike induced in the coil which was generated by the head after a random delay following completion of a write process to a magnetic disk. The effect probably results from the relaxation or sudden change of the magnetic domain structure of the paddle. Such a voltage noise spike can be read (incorrectly) as data during a write verification step.

When this occurs, correct write data can be interpreted by the system as being in error.

The invention provides for configuration of the coil and the paddle of an inductive thin film head so that the pole (paddle) structure is subjected primarily to hard axis ("HA") magnetic write fields. In particular, the head/coil configuration is such that the magnetic field in the easy axis direction does not exceed the local coercivity, $H_c$, of the paddles. Further provided is a pole (paddle) having a large length-to-width ratio, where elongated shapes support domain stability. The ferromagnetic pole itself is formed using a negative magnetostriction material (typically permalloy) to reduce magnetic distortion of the pole domain structure. The overall pole tip length prior to machining is small to minimize interaction observed between slider machining and pole domain structure variation.

DETAILED DESCRIPTION OF THE PREFERRED EMBODIMENT

Figure 1:
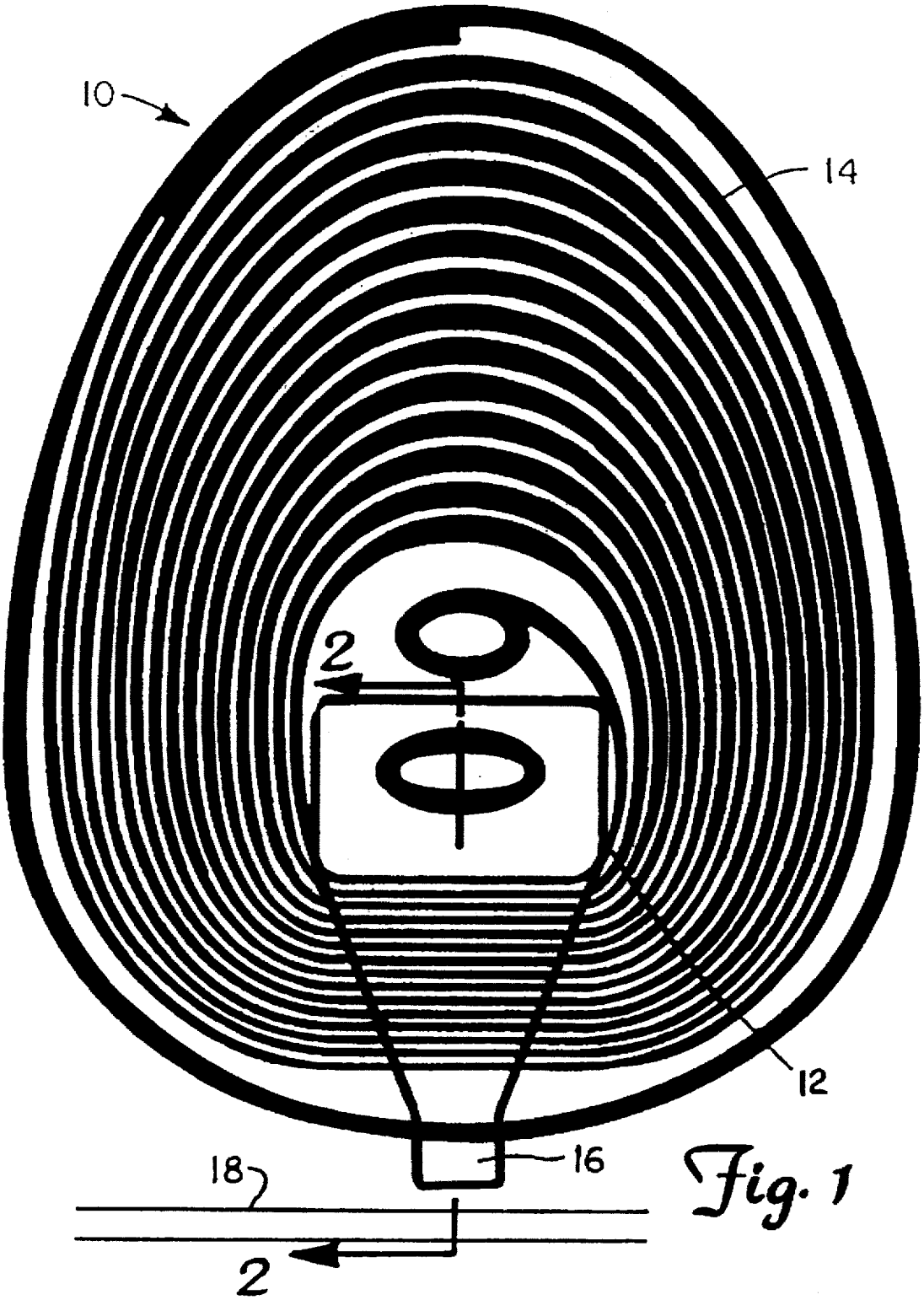
FIG. 1 is a top sectional view of a thin film magnetic read/write head in accordance with the present invention.

As the track width of inductive thin film heads decreases, certain noise phenomena become more and more frequent. One such phenomena, called a glitch, is typified by the occurrence of a noise spike during a read operation in the output voltage of the inductive thin film head after a write process has been completed. The noise spike, which occurs after a short, random, time lag following writing, results in a read noise voltage of sufficient amplitude to cause a system error in the information decoding process of a disk drive. Since it is a desirable to have a system bit error rate of less than $1\times10^{-10}$, and since the glitch phenomena is observed to occur in prior art designs on the order of $1\times10^{-3}$ to $1\times10^{-5}$ for every write, the glitch effect limits system performance.

The origin of the glitch is related to the output voltage of the thin film head ($V_{out}$) as follows:

$$V_{out} = N\frac{d\phi}{dt} \qquad \text{(Equation 1)}$$

$$\begin{aligned} V_{out} &= NK\left(A\frac{dH}{dt} + 4\pi A\frac{dM}{dt}\right) \qquad \text{(Equation 2)} \\ &= NKA\left(\frac{dH}{dt} + 4\pi\frac{dM}{dt}\right) \end{aligned}$$

When an inductive thin film head is reading information, H=O, and dH/dt=0. If the domain structure of the inductive thin film head changes after a write process has terminated, dM/dt has a relatively large value, and a glitch voltage proportional to dM/dt results due to the relationship of Equation 2. Hence the source of glitch can be identified with sudden, thermodynamically irreversible changes in the domain structure of an inductive thin film head after writing.

The glitch is probably triggered either by stress relaxation due to cooling after writing, or by the weak magnetic read fields that the inductive thin film head senses from recorded data.

Three experimental observations have lead to the present invention. First, in the course of studying magnetoresistive head (MRH) domain structure, it has been determined that any axis (EA) drive field tends to leave the domain structure of a paddle in a highly unstable and unpredictable state which can suddenly change. Furthermore, it has also been found in these studies that the domain structure is significantly more reproducible and stable for hard axis (HA) drive fields.

Second, theoretical calculations and pole structure variation experiments indicate that a narrower pole structure further stabilizes the inductive thin film head permalloy domain structure for the negative magnetostriction plating compositions currently employed in inductive thin film head manufacturing.

Third, these studies have also shown that slider machining processes can significantly alter the domain structure if attention is not given to the relation between where machining occurs relative to the magnetic pole structure. Specifically, the slicing of the substrate can damage the pole structure if the slicing operation comes near to or cuts through the pole tip.

The nature of this invention is to utilize these experimental observations in a new approach which minimizes the glitch rate. More specifically, by attempting to minimize the total magnetic energy in the domains of a thin film head, thereby establishing a domain structure with improved stability, the present invention reduces the remote read effect. The curve of total domain wall energy versus number of magnetic domains for a given thin film head pole design and magnetic material properties has a "U" shape. The most stable magnetic domain state being found at the minimum of this curve. The present invention attempts to place the thin film head pole design at the base of this "U" curve in order to optimize domain stability by minimizing domain energy. The aspects of this invention are:

1) A new coil design which subjects the magnetic pole structure to only hard axis drive fields.

2) A narrow pole design which, when used in conjunction with a negative magnetostriction bath, improves the stability of the inherent domain structure.

3) A reduced pole tip length to minimize the interaction between pole tip machining and pole domain structure variations.

FIG. 1 shows a thin film magnetic head 10 in accordance with the present invention. Inductive thin film head 10 includes a pair of yokes, poles or paddles 12, of which only the top pole is seen, conductors 14 formed in a coil and upper pole tip 16. Saw alley 18 extends parallel to the front edge of pole tip 16. The terms yokes, poles and paddles are used interchangeably.

Figure 2:
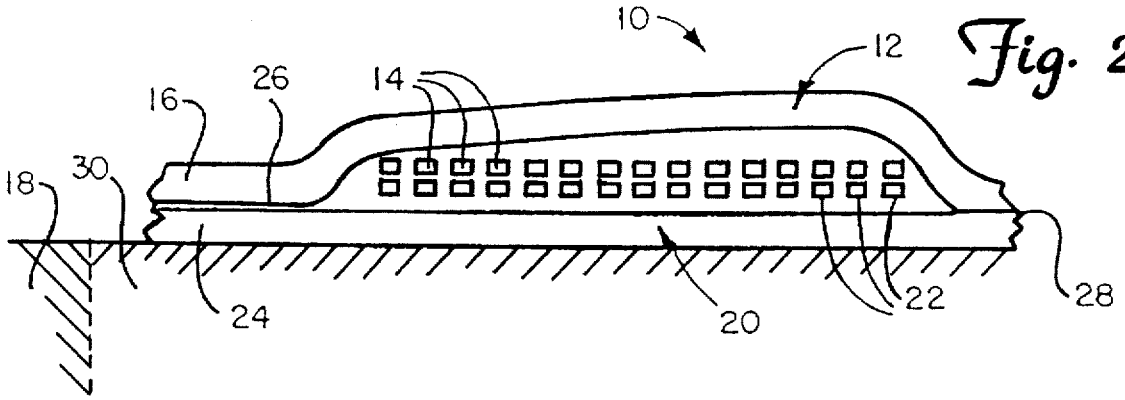
FIG. 2 is a cross sectional view of the thin film head of FIG. 2 taken along line 2—2.

FIG. 2 is a cross sectional view of thin film head 10 taken along line 2—2 in FIG. 1 which is an axis of symmetry of head 10. Lower yoke; pole or paddle 20 of thin film head 10 and upper pole or paddle 12 sandwich conductors 14 and conductors 22. Lower paddle 20 includes lower pole tip 24. Upper pole tip 16 and lower pole tip 24 are separated by an insulating gap layer 26 used for reading and writing information on a magnetic storage medium. Upper paddle 12 and lower paddle 20 are in contact at a back gap via 28. (This contact is not necessarily required.) Thin film head 10 is deposited upon substrate 30 adjacent to saw alley 18. Saw alley 18 or kerf is the area where substrate 30 is sliced, explained below in more detail.

Figure 3:
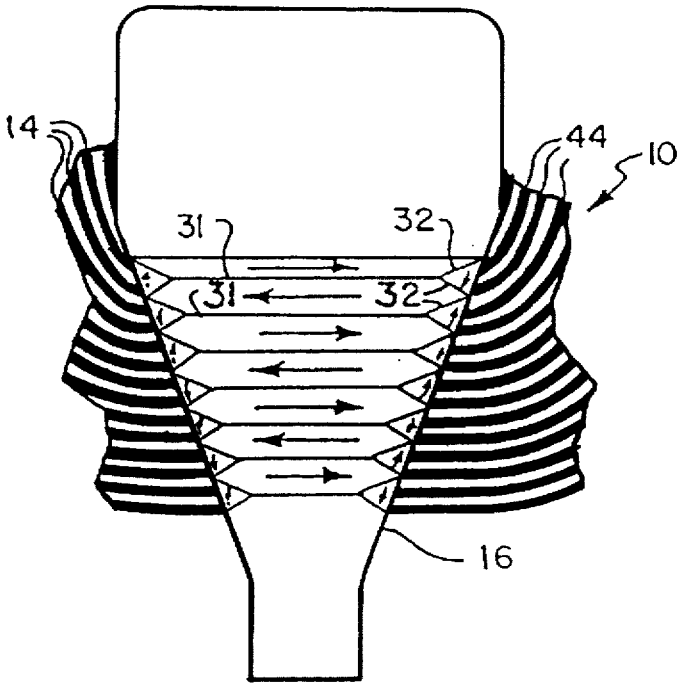
FIG. 3 shows the magnetic domain pattern for the paddle of the thin film head of FIG. 1.

FIG. 3 shows a typical magnetic domain structure of inductive thin film head 10 in accordance with the present invention. FIG. 3 shows horizontal (or "180°") walls 31 and "closure" walls 32, sometimes referred to as "90° walls." The arrows within domains formed by walls 31 and 32 indicate the direction of the material's magnetization in a relaxed state, when no external magnetic fields are applied. (This is also true if all the arrows pointed in the opposite direction.)

As stated above, the present invention uses a three point approach to increase the domain stability and reproducibility in thin film heads. First, the drive field used during the write operation subjects the magnetic head to drive fields pointed only along the hard axis direction. This is achieved as shown in FIG. 1 by forming coil 14 at a perpendicular angle with respect to the magnetic hard axis of paddle 12 of FIG. 2 (which points from back gap 28 toward pole tip regions 16 and 24 along an axis of symmetry through the paddle 12). Coil 14 is formed in a flattened egg or elliptical shape. The windings of coil 14 curve around paddles 12 and 20 but the windings are straight and parallel where they pass between paddles 12 and 20. The straight portion of coil 14 provides a magnetic drive field in the direction of the hard axis of paddles 12 and 20. In comparison, a prior art thin film head includes a coil which is wrapped at a substantially curved angle through the core of the prior art thin film head. By subjecting thin film head 10 of the present invention exclusively to hard axis drive fields, the magnetic domain structure of paddles 12 and 20 are more stable and more reproducible than in prior art thin film paddles, and therefore less susceptible to the glitch or remote read effect. In particular, the head/coil configuration of the present invention limits the drive field applied in the easy axis direction so that it does not exceed the local coercivity ($H_c$) of the magnetic material.

Figure 4:
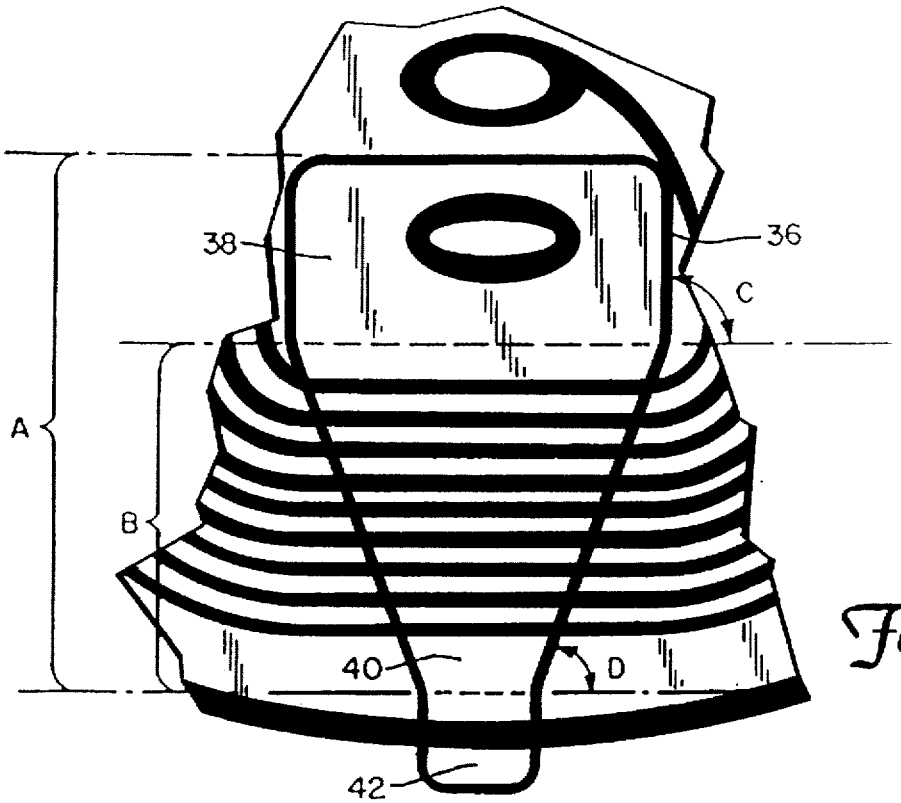
FIG. 4 is a top view of a thin film magnetic head in accordance with the present invention.

FIG. 4 shows an embodiment of the present invention which yields a significantly reduced glitch rate. Thin film head 34 comprises pole 36 and coil 44. Paddle dimensions A and B and angles C and D of pole 36 are shown in FIG. 4. Paddle 36 includes back region 38, middle region 40 and paddle tip region 42. Dimension A is the length of middle region 40 plus the length of back region 38. Dimension B is the length of middle region 40. Angle C is formed between a side of back region 38 and a line perpendicular to the axis of symmetry of paddle 36. Angle D is formed between a side of middle region 40 and a line perpendicular with the axis of symmetry of paddle 36. Through experimental observation on the thin film heads manufactured using standard plated permalloy, suitable values for these dimensions and angles to reduce the glitch rate are as follows:

| Parameter | Value |
|---|---|
| A | 135–165 μm |
| B | Less than 35 μm |
| C | 85°–95° |
| D | 45°–90° |

These values were determined where pole 36 had an anisotropy ($H_K$) between about 3 Oersteds and about 5 Oersteds, a coercivity ($H_c$) of about 0.8 Oersteds, a saturation magnetization ($M_s$) of about 10,000 Gauss, a thickness ($\delta$) between about 1 micron and about 4 microns and a negative magnetostriction. Paddle width at backgap region 38 is calculated using the formula: width=pole tip width+

(2×B/Tan (D)). As the present invention is for use at high recording densities, pole tip width is relatively small and can be substantially ignored in calculating paddle width.

In FIG. 4, thin film head 34 made in accordance with the present invention also uses a reduced paddle width-to-length ratio which is narrower than a prior art paddle. This eliminates the paddle "ears" characteristic of prior art thin film heads. This narrow configuration with respect to the length of paddle 36 in FIG. 4 further stabilizes the inductive thin film head domain structure when negative magnetostriction material is used to form paddle 36. Plating a ferromagnetic alloy with negative magnetostriction is the method currently used in fabricating inductive thin film magnetic heads to produce the desired characteristic magnetic domain structure.

Figure 5:
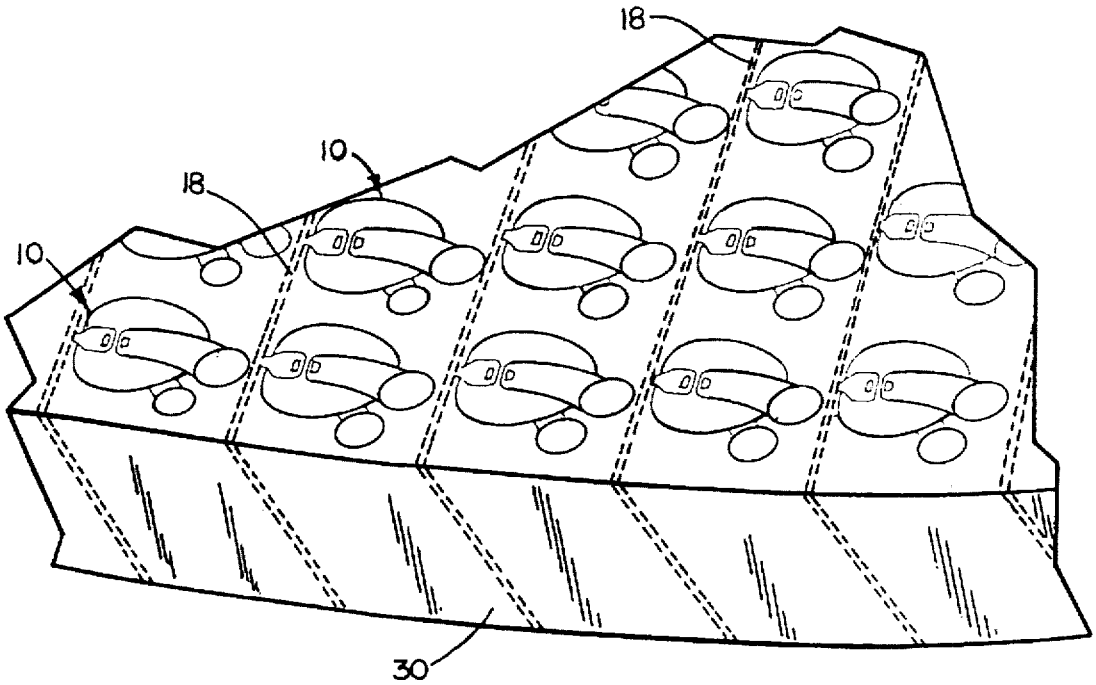
FIG. 5 is a perspective view of a wafer carrying many thin film magnetic read/write heads made in accordance with the present invention.

FIG. 5 is a perspective view of a portion of a substrate 30 carrying thin film magnetic heads 10. During fabrication, many thin film heads 10 are deposited across the surface of substrate 30 as shown in FIG. 5. After heads 10 are deposited, substrate 30 is sliced along "saw alleys" 18 into a plurality of bars, each carrying thin film heads 10 arranged linearly along the bar. The saw alley or kerf is necessary because the process of slicing the substrate removes a swath of material which creates and "alley."

Finally, the present invention uses an improved pole tip design to reduce stress during the sawing process. Inductive thin film head 10 of the present invention includes pole tips 16 (and 24) of FIG. 2 having a shorter length than a pole tip used in a prior art thin film head. The purpose of the reduced pole tip length is to provide an increased distance between pole tips 16 and 24 and saw alley 18. In a prior art thin film head, the pole tips are often very long relative to the head. The dimension was not considered important because the tips were simply cut when the wafer was sliced. Large separation between the end of the pole tip 42 (of FIG. 4) and the saw alley is preferred. In the present invention, however, the pole tip length should be less that about 10 microns. The spacing between the pole tips and the saw alley provides a buffer region which limits induced thin film head stress during the sawing process. Final pole tip dimensions are reached using a standard lapping process in which the pole tips are applied to a mild abrasive such as a diamond slurry. This lapping process is far gentler than the sawing process. By limiting the stress to the thin film head, the domain structure of the thin film head of the present invention remains substantially intact in the final product, further increasing magnetic domain stability and reproducibility over prior art thin film heads.

The inductive thin film magnetic head of the present invention offers improved stability an reproducibility in the magnetic domain pattern thereby limiting the glitch effect or remote read effect. The present invention uses a three point approach to deliver an improved overall thin film head package. First, the coils are formed to produce magnetic drive fields in only the magnetic hard axis direction. Second, a narrower pole design is used which eliminates the "ears" of prior art thin film head paddles and further improves domain structure stability and reproducibility. Finally, the head is subjected to less stress during the fabrication process by limiting the interaction of the sawing process with the structure of the thin film head.

Although the present invention has been described with reference to preferred embodiments, workers skilled in the art will recognize that changes may be made in form and detail without departing from the spirit and scope of the invention. For example, some designs may only use a bottom pole of ferrite made in accordance with the present invention.

What is claimed is:

1. A thin film magnetic recording head comprising:

a substrate;

a magnetic yoke deposited on the substrate including structure defining a top paddle and a bottom paddle for defining a high permeability magnetic flux path, the magnetic yoke deposited upon a nonmagnetic substrate and having an axis of symmetry [, the top and bottom paddles having negative magnetostriction];

spaced apart paddle tips for the top and bottom paddles defining a magnetic flux gap in the magnetic yoke for recording and reading data proximate the flux gap, the paddle tips being normal to the axis of symmetry;

the top and bottom paddles including their respective paddle tips having a hard axis of magnetization generally parallel to the axis of symmetry and an easy axis of magnetization normal to the hard axis of magnetization in a plane of the top and bottom paddles;

a plurality of electrically insulated conductor windings, at least one of the plurality of conductor windings lying in a single plane and extending through the magnetic yoke between the top paddle and the bottom paddle; and the conductor windings are parallel to the easy axis of [magnetorization] *magnetization* and perpendicular to a hard axis of magnetization of the magnetic paddles for maximizing exposure of the magnetic yoke to hard axis magnetic drive fields and minimizing exposure to easy axis magnetic drive fields whereby drive fields in the easy axis direction are less than local coercivity of the magnetic yoke.

2. The thin film magnetic recording head of claim 1 including a saw alley in the substrate, the saw alley extending generally parallel to the easy axis and spaced apart from the paddle tips.

3. The thin film magnetic recording head of claim 1 wherein the top and bottom poles each comprise:

a paddle tip region having a paddle tip width;

a back region having a back region width and a back side which defines a back region length, the back region width larger than the paddle tip width; and a middle region extending between the paddle tip region and the back region and having a front edge with a front edge width which contacts the paddle tip region and a back edge with a back edge width which contacts the back region, the front edge width smaller than the back edge width, the middle region including a middle side extending between the back region and the paddle tip region, wherein the back side and the paddle tips form a first angle and the middle side and the paddle tips form a second angle.

4. The thin film magnetic recording head of claim 3 wherein the first angle is between about 85° and about 95°.

5. The thin film magnetic recording head of claim 3 wherein the second angle is between about 45° and about 90°.

6. The thin film magnetic recording head of claim 3 wherein the middle region includes a middle region length between the back region and the paddle tip region and the middle region length is less than about 35 microns.

7. The thin film magnetic recording head of claim 1 wherein the back region length plus the middle region length is between about 135 microns and about 165 microns.

8. The thin film magnetic recording head of claim 3 wherein:

the first angle is between about 85° and 95°;

the second angle is between about 45° and about 90°;

the middle region includes a middle region length between the back region and the paddle tip and the middle region length is less than about 35 microns; and the back region length plus the middle region length is between about 135 microns and about 165 microns.

9. A thin film magnetic head recording head comprising:

a magnetic yoke including top and bottom poles for defining a high permeability magnetic flux path, the top and bottom poles having a hard axis of magnetization; and a flattened, generally elliptical coil laying in a single plane and extending through the magnetic yoke including a flattened portion having a plurality of substantially parallel conductors extending through the magnetic yoke and a substantially elliptical portion extending beyond the magnetic yoke wherein the plurality of substantially parallel conductors are perpendicular to the hard axis of magnetization and parallel to the easy axis for maximizing exposure of the magnetic yoke to hard axis magnetic drive fields and minimizing exposure of the magnetic yoke to easy axis magnetic drive fields whereby magnetic drive fields in an easy axis direction are less than local coercivity of the magnetic yoke.

10. A thin film magnetic head, comprising:

a substrate;

a magnetic lower pole piece deposited over the substrate including a lower pole tip;

an insulating layer deposited over the lower pole piece;

a magnetic gap layer deposited over the lower pole tip;

a magnetic upper pole piece deposited over the magnetic lower pole piece and including an upper pole tip deposited over the magnetic gap layer, the magnetic upper and lower pole pieces forming a magnetic flux path to the upper and lower pole tips which form a magnetic flux gap across the magnetic gap layer, the upper and lower pole pieces having a hard axis of magnetization and an easy axis of magnetization which is perpendicular to the hard axis of magnetization, and the magnetic upper and lower pole pieces have a coercivity; and a plurality of electrical conductors, at least one of the plurality of electrically conductors lying in a single plane and extending through the insulating layer and between the magnetic upper pole piece and the magnetic lower pole piece, the plurality of electrical conductors being oriented parallel with the easy axis of magnetization and perpendicular to the hard axis of magnetization of the magnetic upper and lower pole pieces for maximizing exposure of the magnetic upper and lower pole pieces to hard axis magnetic drive fields produced by the plurality of electrical conductors and minimizing exposure of the magnetic upper and lower pole pieces to easy axis magnetic drive fields produced by the plurality of electrical conductors, whereby an electrical current passed through the plurality of electrical conductors provides a magnetic field parallel to the hard axis of magnetization and perpendicular to the easy axis of magnetization of the magnetic upper and lower pole pieces so that magnetic drive fields in an easy axis direction are less than local coercivity of the pole pieces.

11. The thin film head of claim 10 wherein the substrate includes a saw alley which extends generally parallel with the easy axis and spaced apart from the upper and lower pole tips.

12. The thin film head of claim 10 wherein the magnetic upper and lower pole pieces have and overall length between a back gap which is opposite the upper and lower pole tips and the upper and lower pole tips, and a middle region length and a ratio between the middle region length and the overall length is less than about 0.21.

* * * * *